United States Patent
Bauer (10) Patent No.: US 12,474,566 B2
(45) Date of Patent: Nov. 18, 2025

(54) BEAM SPLITTING DEVICE FOR A DISTAL END SECTION OF AN ENDOSCOPE, OBJECTIVE SYSTEM AND ENDOSCOPE

(71) Applicant: KARL STORZ SE & Co. KG, Tuttlingen (DE)

(72) Inventor: Franz Bauer, Seitingen-Oberflacht (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 231 days.

(21) Appl. No.: 18/343,283

(22) Filed: Jun. 28, 2023

(65) Prior Publication Data

US 2024/0004182 A1   Jan. 4, 2024

(30) Foreign Application Priority Data

Jun. 30, 2022 (DE) .......................... 102022116292.3

(51) Int. Cl.
*G01N 21/64* (2006.01)
*G02B 23/24* (2006.01)
(Continued)

(52) U.S. Cl.
CPC .......... *G02B 23/243* (2013.01); *G01N 21/64* (2013.01); *G02B 23/2461* (2013.01);
(Continued)

(58) Field of Classification Search
CPC .............. G02B 23/243; G02B 23/2461; G02B 23/2484; G02B 27/126; G02B 27/141;
(Continued)

(56) References Cited

U.S. PATENT DOCUMENTS 8,007,433 B2   8/2011  Iketani
2010/0210904 A1  8/2010  Cline et al.
(Continued)

FOREIGN PATENT DOCUMENTS

CN    208872911 U  * 5/2019  .......... G02B 6/4206
DE    102009024943 A1   12/2010
(Continued)

OTHER PUBLICATIONS

Eigenwillig, German Search Report, Mar. 22, 2023, pp. 1-4, German Patent Office, Munich.
Rick, K., Extended European Search Report, Nov. 3, 2023, pp. 1-6, European Patent Office, Munich.

*Primary Examiner* — Kiho Kim
(74) *Attorney, Agent, or Firm* — David N. Villalpando; Jacqueline Cohen (57) ABSTRACT

A beam splitting device for a distal end of an endoscope, the beam splitting device comprising a first prism with a first entrance surface, a first internal incident surface, and a first exit surface; and a second prism with a second entrance surface and a second exit surface; and a dichroic beam splitting layer. The first exit surface of the first prism and the second entrance surface of the second prism are adjacent and the dichroic beam splitting layer is arranged between the surfaces so incoming beams comprising first and second spectral regions are reflected by the first internal incident surface of the first prism, incident on the first exit surface of the first prism and are split by the dichroic beam splitting layer into beams of the first spectral region and the second spectral region. An objective system and an endoscope with the beam splitting device are also presented.

15 Claims, 3 Drawing Sheets

(51) Int. Cl.
*G02B 27/12* (2006.01)
*G02B 27/14* (2006.01)
*A61B 1/00* (2006.01)
*A61B 1/04* (2006.01)
*A61B 1/06* (2006.01)

(52) U.S. Cl.
CPC ....... *G02B 23/2484* (2013.01); *G02B 27/126* (2013.01); *G02B 27/141* (2013.01); *A61B 1/00096* (2013.01); *A61B 1/043* (2013.01); *A61B 1/0653* (2013.01)

(58) Field of Classification Search
CPC ............ G02B 27/1013; G02B 23/2423; G02B 23/2446; G01N 21/64; A61B 1/00096; A61B 1/043; A61B 1/0653; A61B 1/051; A61B 1/00186; A61B 1/05; A61B 1/00045; A61B 1/0661; H04N 23/16; H04N 23/45; H04N 23/555
See application file for complete search history.

(56) References Cited

U.S. PATENT DOCUMENTS

| | | |
|---|---|---|
| 2012/0248333 A1 | 10/2012 | Fallert et al. |
| 2013/0041267 A1 | 2/2013 | Ntziachristos et al. |
| 2015/0148630 A1 | 5/2015 | Meester |
| 2015/0168702 A1* | 6/2015 | Harris ................. G02B 21/367 250/306 |
| 2017/0209050 A1* | 7/2017 | Fengler .................... G01J 3/10 |
| 2018/0262725 A1 | 9/2018 | Fan |
| 2019/0038118 A1* | 2/2019 | Meester ............. G02B 23/2453 |
| 2019/0170647 A1 | 6/2019 | Ikenaga et al. |
| 2020/0073028 A1* | 3/2020 | Shigemitsu .............. G02B 5/04 |

FOREIGN PATENT DOCUMENTS

| | | | |
|---|---|---|---|
| DE | 102008062650 B4 * | 8/2021 | ......... G02B 21/0012 |
| EP | 3346897 B1 | 4/2021 | |
| WO | 9964915 A1 | 12/1999 | |

* cited by examiner

BEAM SPLITTING DEVICE FOR A DISTAL END SECTION OF AN ENDOSCOPE, OBJECTIVE SYSTEM AND ENDOSCOPE

CROSS REFERENCE TO RELATED APPLICATIONS

This application claims priority to German Patent Application No. 102022116292.3, filed Jun. 30, 2022, and entitled, "Beam Splitting Device for a Distal End Section of an Endoscope, Objective System and Endoscope," which is incorporated herein by reference.

FIELD OF THE INVENTION

The present invention is directed to an optical system for an endoscopy device and an endoscopy system.

BACKGROUND OF THE INVENTION

Endoscopes for use in medical and industrial applications may utilize both, white light and fluorescence imaging. Endoscopic instruments intended for industrial use, rather than medical use, are often referred to as borescopes. As this invention relates to both medical endoscopes and borescopes the term "endoscope" is used to generally include both instruments. Conventional endoscopes able to capture both white light and fluorescence images with a single optical path and only a single image sensor do so by collecting alternating frames with staggered white light and excitation illumination. Such system arrangement results in a frame rate that is significantly lower than a frame rate of a system using only visible white light, typically reaching, at most, half of the frame rate of an only white light system. Beside the necessary shuttering between white light and fluorescence frames, additionally the sensitivity of the fluorescence frames is limited by the several optical elements along the single, shared optical path, which typically results in the inability to attenuate one signal relative to the other signal. Image processing subsequently analyzes and combines the images from alternating frames into a fluorescence/white light overlay with a low overall frame rate. This technique results in a lower sensitivity in the fluorescence range as well as a reduced brightness and resolution of the overlaid image compared to a single white light image.

Instead of using just one image sensor, shuttering the frames and overlaying the white light and fluorescence images, an alternative solution would be to place two complete objective systems in an endoscope for capturing white light and fluorescence images separately. However, due to the space requirements of two objective systems in parallel, not to mention the added complexity of orientation, this is not a feasible solution for chip-on-the-tip (COTT) endoscopes, where the respective electronic image sensor or sensors is/are arranged in the distal end section, e.g. the tip of the narrow shaft of the endoscope.

US 2012/0248333 A1 discloses a device for fluorescence diagnosis, which can be simultaneously operated in a fluorescence mode and a white light mode and includes a camera with a first image sensor for receiving a white light image and a second image sensor for receiving a fluorescence image, wherein the camera can be connected to a proximal end of an endoscope or arranged in the distal end section of a shaft of the endoscope. The camera includes a beam splitter, which divides the observation path into a first sub-path and a second sub-path directly on the interface between a first prism and a second prism of the beamsplitter. An observation spectral filter for blocking light in the spectral ranges outside of the fluorescence associated with the second image sensor, for capturing fluorescence light, can be arranged in the interface between both prisms, the second prism functioning as fluorescence path for directing the fluorescence light to the second image sensor. In contrast, the white light is reflected at the interface to the first sub-path and directed to the first image sensor. Due to the immediate and direct splitting at the interface between the two prisms, both prisms have the same physical dimensions in their length and height and the beamsplitter has a square design, by which the second image sensor is arranged perpendicular to the optical path and to the first image sensor.

EP 3 346 897 B1 describes a medical imaging device connectable to a microscopic system or, as a camera head, to an endoscopic system that comprises a color separation prism with a dichroic film configured to split incident light into a first light with a visible light wavelength band and a second light with a fluorescence wavelength band. The color separation prism comprises a first prism and a second prism, wherein incident light entering the first prism is immediately and directly split by the dichroic film at the interface between the first prism and the second prism. The visible light split by the dichroic film, reflected within the first prism, and reflected again at a reflective surface of the first prism, and thereby directed to the first image sensor located outside of the first prism for capturing visible light. The second prism functions as a fluorescence optical path, passing the fluorescence light, which has passed through the dichroic film, to a second fluorescence image sensor. The position of the second fluorescence image sensor can be shifted along the optical path relative to the second prism to adjust the relative optical path lengths of the visible light optical path and the fluorescence optical path. In this color separation prism, the exit side of the second prism and the fluorescence image sensor are arranged perpendicular to the optical axis and, due to the total reflection condition of the visible light at the reflective surface directed towards the incident light, the longest side of each, the first prism and the second prism, are arranged perpendicular to each other. Therefore, the color separation prism is space-consuming both in the longitudinal direction along the optical path as well as in its height and is consequently not suitable to be arranged in a narrow shaft of an endoscope.

BRIEF DESCRIPTION OF THE INVENTION

The present invention relates to a beam splitting device for a distal end section of an endoscope, wherein the beam splitting device comprises a first prism with a first entrance surface, a first internal incident surface and a first exit surface, a second prism with a second entrance surface and a second exit surface, and a dichroic beam splitting layer, and at least a first image sensor for capturing light of a first spectral region and a second image sensor for capturing light of a second spectral region are assignable to the beam splitting device, wherein the first spectral region and the second spectral region differ at least partially from each other. Furthermore, the invention concerns an objective system and an endoscope.

DETAILED DESCRIPTION OF THE INVENTION

The beam splitting device comprises a first prism with a first entrance surface, a first internal incident surface and a first exit surface, a second prism with a second entrance surface and a second exit surface, and a dichroic beam splitting layer, and at least a first image sensor for capturing light of a first spectral region and a second image sensor for capturing light of a second spectral region are assignable to the beam splitting device, wherein the first spectral region and the second spectral region differ at least partially from each other, and the first exit surface of the first prism and the second entrance surface of the second prism are adjacent, and the dichroic beam splitting layer is arranged between the adjacent surfaces so that incoming beams comprising the first and second spectral regions are reflected by the first internal incident surface of the first prism, incident on the first exit surface of the first prism, and are split by the dichroic beam splitting layer into first beams of the first spectral region and second beams of the second spectral region for capturing separate images of the first spectral region by the first image sensor and of the second spectral region by the second image sensor in parallel.

Therewith, a dichroic beamsplitter is provided for a chip-on-the-tip endoscope enabling the simultaneous capturing of images of two different spectral regions by two separate image sensors. Consequently, an increase of the overall frame rate, the respective sensitivity, and the brightness of captured images of the respective spectral region can be achieved over that of state-of-the-art endoscopes employing a single optical path. Due to the specific design of the beam splitting device with the arrangement of the first internal incident surface of the first prism, the first exit surface of the first prism, and the second entrance surface of the second prism adjacent to the first exit surface of the first prism, with a dichroic beam splitting layer arranged between these adjacent surfaces, a space-saving beam splitting device is provided which is small enough to be arranged in a distal end section and/or the distal tip of an endoscope.

Furthermore, due to the geometric and space-saving design of the beam splitting device, an optimization of the relative beam path is enabled by introducing further optical elements and/or coatings that are present only in each respective path. Therewith, the sensitivity and image brightness of a defined spectral region can be optimized without necessarily influencing the optical parameters of the other spectral region.

One of the primary ideas of the invention is the special design of the beam splitting device with the first exit surface of the first prism and the second entrance surface of the second prism as adjacent surfaces and the dichroic beam splitting layer arranged between these adjacent surfaces and/or on one surface of the adjacent surfaces. In contrast to known beam splitting prisms, where, after entering the first prism, the incident light is split immediately and directly by a dichroic coating placed on the first exit surface of the first prism, just upstream of the interface between both prisms, in the present inventive beam splitting device, the incident beams comprising the first and second spectral regions are reflected first of all by the first internal incident surface of the first prism, pass further and incident on the first exit surface of the first prism, before these reflected incident beams are split by the dichroic beam splitting layer into first beams of the first spectral region and second beams of the second spectral region. Therewith, a space-saving geometry of the first and second prism and the overall beam splitting device is realized, allowing an easy fitting of the beam splitting device and/or the assignable image sensors inside the shaft of an endoscope in the longitudinal and radial direction and enabling a simultaneous capture of separate images in the first spectral region and the second spectral region, each by a separate, dedicated image sensor, resulting in improved image quality.

The geometry of each first and second prism and therewith of the beam splitting device can be designed more flexibly, because, in the travel direction of the incident beams, after traveling through the first entrance surface, the incident beams are not split directly by an interface between the first prism and the second prism in the same travel direction, but instead are first reflected by the first internal incident surface and passed towards the first exit surface of the first prism, and are only then split by the dichroic beam splitting layer arranged between the first exit surface of the first prism and the second entrance surface of the second prism into two beams with different spectral regions. Consequently, the physical dimensions of the first prism and the second prism as well as the local arrangement of the first image sensor and the second image sensor can be chosen more flexibly, and therewith can be more easily adapted to the limitations of each particular shaft diameter, and the available space inside the shaft.

As utilized in accordance with the present disclosure, the following terms, unless otherwise indicated, shall be understood to have the following meanings.

A "beam splitting device" is, in particular, an optical device that splits a beam of light into two beams. The beam splitting device is, in particular, used to split the incident beams into two separate beams at a specific ratio and therewith into first beams of the first spectral region and second beams of the second spectral region. Preferably, the beam splitting device efficiently splits the incident light such that, as nearly as practical, 100% of the reflected light is of the first spectral region and 100% of the transmitted light is of the second spectral region. In this respect, it is stressed that the terms "first" and "second" are used only for differentiation and not for a certain sequence, so that, vice versa, also the first beams of the first spectral region can be transmitted through the adjacent surfaces and pass through the second prism and the second beams of the second spectral region can be reflected by the dichroic beam splitting layer and pass through the first prism and leave it through the first internal incident surface. The beam splitting device is, in particular, a dichroic beamsplitter with two prisms that splits light into two beams of different wavelengths or wavelength ranges and therefore into different spectral regions. Therefore, the beam splitting device comprises the dichroic beam splitting layer arranged between the adjacent surfaces of both prisms and/or the exit surface of the first prism and/or the second entrance surface of the second prism. In contrast to beamsplitters known in the art, the beam splitting device does not comprise two triangular prisms, which are combined at their base and therefore at their longest side of each triangle. Instead, in the inventive beam splitting device, the first exit surface of the first prism as, in particular, the second-longest side of the first prism is arranged adjacent to the second entrance surface of the second prism and therefore the base of the second prism. Consequently, the inventive beam splitting device does not have a cube shape. Therewith, the first beams of the first spectral region that are reflected at the adjacent surface by means of the dichroic beam splitting layer and the second beams of the second spectral region that are transmitted through the dichroic beam splitting layer and further through the second prism can have different optical paths within the respective prisms. The first prism of the beam splitting device functions first by reflection of the incident beams on its first internal incident surface as a common optical path for the incident beams and therewith the included beams of the first spectral region and the second spectral region and, only after splitting by the dichroic beam splitting layer, the first prism additionally functions as the optical path for the reflected first beams of the first spectral region to be incident on the first internal incident surface, and leaving the first prism through the first internal incident surface to be captured by an assignable first image sensor. Therewith, the second prism only functions as the optical path for the transmitted second beams of the second spectral region.

"A prism" is understood in particular as a component in the form of a geometric body prism. The prism can be used for different optical effects. The optical properties of the prism in particular depend on the triangular angles and/or the position of the optically effective prism surfaces in relation to one another and on the refractive index of the material. In particular, the first prism and the second prism comprise glass, and the glass of the first and second prisms are selected to have the same, or nearly the same, refractive index. In a sectional view parallel to the travel direction of the incident light and therewith in a longitudinal section, the first prism and the second prism each have a substantially triangular shape. "Substantially triangular" in particular means that not all three angles of the triangle shape of the prism have to be an acute angle. One or more angles of the triangle shape can also be formed obtuse or trimmed, and therefore not fully angular. Therewith, instead of an angle, two corners with a side in between each other can be exit in a sectional and/or longitudinal section. Preferably, the first prism does not comprise a right angle, while the second prism can comprise a right angle in the longitudinal section. Of course, instead of angles in the corners of the prism or an obtuse side, the corners may be curved or shaped differently.

The "first entrance surface" of the first prism is in particular the surface of the first prism through which the incoming beams (incident beams) comprising the first and second spectral regions enter the first prism. A region of the first entrance surface of the first prism may act as an entrance aperture, and regions outside of an effective diameter of the incoming beam may be made opaque to incoming light. Preferably incoming beams only enter the beam splitting device via the first entrance surface of the first prism. A respective surface of the second prism directed towards the incoming beams is, in particular, not transmissive for the incoming beams. Therefore, areas of the first entrance surface of the first prism, and the non-beam passing surfaces of the second prism may be coated with an opaque substance, such as black paint, to avoid any stray or unwanted light from passing thereinto.

The "first internal incident surface" of the first prism is, in particular, the base and therewith the longest side of the first prism. In particular, the first internal incident surface is arranged in the travel direction of the incoming beams, so that, after entering the first prism through the first entrance surface, the incoming beams incident on the first internal incident surface are reflected by the first internal incident surface toward the adjacent surfaces of the two prisms, and therewith the dichroic beam splitting layer therebetween. At the first incidence on the first internal incident surface this surface, in particular, serves as a first reflecting surface for all spectral regions and only after this reflection the splitting by the dichroic beam splitting layer follows. After beam splitting, the first beams of the first spectral region, that are reflected by the dichroic beam splitting layer, can incident on and pass through the first internal incident surface. Thus, the first internal incident surface is, in particular, a total internal reflection (TIR) surface in case of the first common incidence of both spectral regions and a transmissive surface in case of the second incidence only by the reflected beams of the first spectral region.

The "first exit surface" of the first prism is, in particular, the surface of the first prism that is adjacent to the second entrance surface of the second prism. In the longitudinal section, the first exit surface is in particular the bottom side of the first prism, whereby the first prism is arranged above the second prism.

The second prism is preferably a right-angled triangle in the longitudinal section, wherein the right angle is arranged at the bottom of the second prism opposite the second entrance side. The "second entrance side" of the second prism is, in particular, the longest side of the second prism, and therewith the hypothenuse. The "second exit surface" is, in particular, the surface of the second prism that is arranged substantially in parallel to the travel direction of the incoming beams and/or the optical axis.

Regarding the term "adjacent to" it is understood that the first exit surface of the first prism and the second entrance surface of the second prism are arranged next to each other and/or neighboring. However, the first exit surface of the first prism and the second entrance surface of the second prism do not have to be in direct contact to each other. Therefore, by "adjacent to" it is also meant that light beams are passed first through the first exit surface of the first prism and afterwards through the second entrance surface of the second prism. Thus, both adjacent surfaces with the dichroic beam splitting layer arranged therebetween can be arranged directly or indirectly next to each other. In the latter case, the adjacent surfaces can be separated by another material, an air gap and/or other element.

In general, the geometry of the first and second prism as well as the beam splitting device can be varied in the lengths of the respective sides in the longitudinal and/or cross sections, in the area of the single surfaces of the first and second prism as well as the internal angles between the sides of the respective surfaces in the longitudinal and/or cross sections, as long as the described and required functions of the first prism and the second prism and therewith the overall performance of the beam splitting device are achieved. It is important that the beam angles for each of the prisms of the beam splitting device be so arranged such that light reflected from the first exit surface back into the first prism will be incident on the first internal incident surface at close to 90°. With this in mind, the remaining angles can be selected. In one such example, in the longitudinal section the internal angle between the first entrance surface and the first internal incident surface of the first prism may be 45°. The internal angle between the first entrance surface and the first exit surface of the first prism may be 112.5°. The internal angle of the surface of the second prism perpendicular to the incoming beam, and therewith extending from the first entrance surface of the first prism downwards, may be 90°, and the internal angle between the second entrance surface and the second exit surface may be 23° in the longitudinal section. As a result of this prism geometry, light beams that are not transmitted through the first exit surface of the first prism are reflected at approximately 45°, and thus are incident, as desired, on the first internal incident surface of the first prism at approximately 90°, resulting in their transmission therethrough. Thus, many prism designs are possible, where light incoming into the first prism is first reflected from the first internal incident surface and subsequently passed therethrough after reflection at the first exit surface.

The "internal angle" is the angle enclosed by two adjacent sides that lie inside the respective prism. The corners of the prism form the vertex of the internal angle.

A "dichroic beam splitting layer" in particular is a thin layer that selectively reflects or transmits light depending on the light's wavelength. The dichroic beam splitting layer is selected such that incoming light is split into the first beams of the first spectral region and the second beams of the second spectral region. The dichroic beam splitting layer can be a coating applied to the first exit surface of the first prism. In certain embodiments, the beam splitting layer may be a coating applied to both the first exit surface of the first prism and a coating applied to the second entrance surface of the second prism. The adjacent surfaces of the prisms, with associated coating/coatings may be adhered by optical cement. The combination of these coated surfaces and optical cement may thereby act as a dichroic filter. With the term "the dichroic beam splitting layer is arranged between the adjacent surfaces" is meant, in particular, that the dichroic beam splitting layer and/or coating is arranged on at least one surface of both adjacent surfaces. Therewith one dichroic beam splitting layer can be arranged on the first exit surface of the first prism or on the second entrance surface of the second prim or two dichroic beam splitting layers can be arranged on the first exit surface of the first prism and on the second entrance surface of the second prism. However, the exact bandpass of the dichroic beam splitting layer also depends on the angle of incidence of the incoming light which has previously been reflected by the first internal incident surface of the first prism. For example, the dichroic beam splitting layer is selected for an angle of incidence (AOI) of 22.5° for the previously reflected incoming beams to be reflected back to the first internal incident surface as the first beams of the first spectral region. Hereby, the selected AOI of 22.5° is not a sharp cut-off for the reflection of the first beams of the first spectral region. A dichroic beam splitting layer can also be a dielectric coating or a dichroic mirror. The dichroic beam splitting layer can be arranged between or at one of the adjacent surfaces or an air gap can additionally be arranged between the adjacent surfaces. Preferably, on the dichroic beam splitting layer, the first beams are reflected 45°, and the second beams are transmitted and passed towards the second prism.

The "angle of incidence" (AOI) is, in particular, the angle between a ray incident on a surface and the line perpendicular to this surface at the point of incidence (called the "normal").

The "optical axis" is, in particular, a line along which some degree of rotational symmetry exists in an optical system. The optical axis is, in particular, an imaginary line that defines the path along which the incoming beams propagate through an objective system in front of the beam splitting device or enter the beam splitting device. Preferably, the optical axis passes through the center of curvature of each optical element within a lens system and/or objective system and/or the first entrance surface of the first prism of the beam splitting device. However, the optical axis can also be bent and/or directed by a lens, an optical element, and/or the beam splitting device, including both prisms.

An "endoscope", in particular a video endoscope, is an endoscope with a means for digital image acquisition at the distal end of the elongate shaft, and the transmission of data therefrom, for example, to the proximal end of the endoscope. The endoscope comprises an elongate shaft and a handle which are connectable to each other. In the present invention, at least two digital image sensors are located at the distal end of the elongate shaft for image acquisition. In particular, the video endoscope is any kind of digital endoscope, for example a 2D colonoscope or gastroenteroscope or a 3D video endoscope. In particular, the endoscope is a chip-on-the-tip endoscope (COTT).

The "elongate shaft" is, in particular, a rigid, semi-flexible or flexible tube. In particular, the shaft is configured for being inserted into a cavity to be viewed endoscopically, for example a cavity of a human or animal body. In industrial applications, the endoscope, or borescope, shaft will be placed into an element such as a pipe or another area which is difficult to access directly, such as behind a wall. Generally, the shaft may have an outer diameter in the range of 4 mm to 10 mm. Besides the objective system and two or more image sensors, the shaft may comprise one or more channels for irrigation or passing through working instruments (generally referred to as "working channels") in order to achieve the desired effect in the cavity or opening. The shaft can be detachably connected at its proximal end to a handle or be permanently connected thereto. The distal end section of the elongate shaft is the section remote from the user, while the proximal end section of the shaft is closer to the user.

An "image sensor" has, in particular, its sensor plane in an image plane of the beam splitting device. The sensor plane of the first image sensor can be arranged substantially at a distance from, and in parallel to, the first internal incident surface of the first prism, and the sensor plane of the second image sensor can be arranged at a distance from, and substantially parallel to, the second exit surface of the second prism. The image sensor, in particular an electronic image sensor, may be, for example, a charge-coupled device (CCD) or a complementary metal-oxide semiconductor (CMOS). Preferably, the electronic image sensor is a high-definition (HD) image sensor having, for example, full HD resolution. In general, the electronic image sensor is configured to convert the captured image into electrical image signals and therefore image data. In particular, the electronic image sensor is arranged in the distal end section, e. g. the tip of the shaft, and transmits the electrical image signals from the distal end of the shaft to its proximal end by electric transmission lines, such as wires, cables and/or a flexible printed circuit board. Preferably the electric image signals generated by the electronic image sensor are transferred from the shaft to the handle of the endoscope and/or a display system and/or a processing unit for displaying the captured images. Alternatively, the electrical image signals may be transmitted wirelessly, either directly from the distal end section, or after being relayed to a transmitter contained in the handle. The first image sensor and the second image sensor assigned to and/or arranged outside of the beam splitting device are, in particular, arranged in the distal tip or the distal end section of an endoscope. In case of a 3D-video endoscope, respectively, four image sensors are arranged in parallel, each set of two image sensors providing visible and fluorescent images from a given, distinct perspective.

With respect to "the first spectral region and the second spectral region differ at least partially from each other" it is understood that the first spectral region, and therewith a first wavelength band, and the second spectral region, and therewith a second wavelength band, do not include exactly the same wavelengths. However, the first spectral region may include completely the second spectral region or vice versa. For example, the first spectral region may comprise the wavelength range of 400 nm to 900 nm and the second spectral region may comprise the wavelength range of 700 nm to 800 nm.

In a further embodiment, the beam splitting device comprises the first image sensor and/or the second image sensor.

Therefore, maintaining the compact design of the beam splitting device, the first image sensor can be arranged outside of the first internal incident surface of the first prism and/or the second image sensor outside at the second exit surface of the second prism. Consequently, the first image sensor and/or the second image sensor are likewise arrangeable inside the distal end section of a shaft of an endoscope. In the arrangement of the first sensor and the second image sensor, preferably both image sensors are mechanically and/or digitally aligned to each other. Preferably, both image sensors for capturing the first beams with the first spectral region and the second beams with the second spectral region are arranged at a respective distance to the beam splitting device such that the optical path lengths of both paths have the same value, such that an in-focus image is acquired for both the first and second beams. The first image sensor and the second image sensor can comprise each a cover glass directed towards the respective surface of the first prism and the second prism.

For an optimal split of the incoming beams being immediately reflected by the first internal incident surface of the first prism, the dichroic beam splitting layer is arranged on the first exit surface of the first prism or on the second entrance surface of the second prism.

In yet a further embodiment of the invention, a light source is assignable to the beam splitting device with a first illumination spectral region comprising white light and a second excitation spectral region comprising excitation light, so that a fluorophore within an illuminated scene is caused to emit fluorescent light.

Therewith, despite using just one optical path for the incoming beams, by means of the beam splitting device, white light and fluorescence images can be collected simultaneously and separately by the first sensor dedicated to white light imaging in the visible light range and the second image sensor dedicated to fluorescence imaging. Consequently, a high overall frame rate in the overlay mode and increased sensitivity for fluorescence imaging while maintaining the white light brightness can be obtained for a chip-on-the-tip endoscope compared to conventional means of endoscope shuttering between white light and fluorescence frames.

In some embodiments, a single illumination spectral region will contain both the illumination spectral region and the excitation spectral region.

"White light" (also called "visible light") is usually understood to refer to a combination wavelengths of light at from 380 nm to 750 nm, that is between the ultraviolet and infrared regions, that is, electromagnetic radiation within the portion of the spectrum perceived by the human eye.

"Fluorescent light" is, in particular, an emission of light by a substance called a fluorophore that has absorbed light or other magnetic radiation. The fluorophore is usually irradiated with a specific excitation wavelength or wavelength band resulting in the emission of light with a specific emission wavelength or wavelength band. Normally, the emission wavelength is longer than the excitation wavelength. For example, in case of the commonly used fluorophore indocyanine green (ICG), the excitation wavelength range is between 600 nm and 900 nm and the emission wavelength range is between 750 nm and 950 nm in the IR spectrum. In fluorescence imaging, which is often used to optically define a tumorous region during surgery, a biological material, such a tissue in a body cavity is dyed with a fluorophore directly, or an administered substance is converted into a fluorophore by the body or a microorganism prior to imaging with an endoscope. Additionally, auto fluorescence can also be observed without previous colorization by a fluorophore or dye.

Consequently, "fluorescence light" may refer to the excitation and/or emission wavelengths or wavelength bands of a fluorophore. Radiation that causes a fluorophore to emit fluorescent light is generally referred to as "excitation light" and the resulting light emitted from the fluorophore is referred to as "emission light" or "fluorescent light". In fluorescence imaging, an optional fluorescence filter can block the excitation wavelength from reaching the detecting image sensor, and therefore the fluorescence light comprises only the light emitted by the fluorophore.

For achieving a high-performance dichroic splitting by the dichroic beam splitting layer, an air gap can be arranged between an exit side of the dichroic beam splitting layer and the second entrance surface of the second prism.

Therefore, the properties of the dichroic beam splitting layer can be selected in order to maximize the required reflection of the first beams of the first spectral region. Such a selection is achieved by determining the proper characteristics of the dichroic beam splitting layer with respect to the air gap. For this, the air gap can have a dimension in the range of 2 µm to 30 µm, in particular 5 µm to 20 µm, preferably 7.5 µm to 15 µm. By this, the contrast between the images of the first beams and/or white light and the second beams and/or fluorescent light is increased and it is assured that no white light beams hit the second image sensor dedicated to fluorescence light capturing.

In a further embodiment, one distancing element is, or two or more distancing elements are, arranged in the air gap outside of the region of the adjacent surfaces through which the second beams of the second spectral region pass.

By arranging one distancing element or several distancing elements in the air gap, the dimension of the air gap can be adjusted precisely. As the distancing element or the distancing elements can be arranged at the edges of the adjacent surfaces and/or the dichroic beam splitting layer, the second beams of the second spectral region can pass the air gap without hitting the respective distancing elements and consequently without any negative optical interference.

A "distancing element" is, in particular, any element that is arrangeable in the air gap, providing a precise depth of the air gap. A distancing element can be any three-dimensional body, for example a thin plate at outer opposite sides of the air gap, whereby the second beams pass through the central region of the air gap. Likewise, three or more beads can be used as distancing element or electroformed foils can be employed with an appropriate thickness.

For fixing the distancing element or the distancing elements spatially, the distancing element or the distancing elements can be immobilized by an adhesive in the air gap.

By fixing the distancing element or the distancing elements by means of the adhesive, a precise distance between the first exit side of the first prism with the dichroic beam splitting layer and the first entrance surface of the second prism as well as a high reproducibility of the performance of the dichroic beam splitting layer for reflecting the white light ray path and a long lifetime of the dichroic beam splitting layer are provided. Therefore, a high precision dosage of the adhesive, preferably with distancing elements, such as a plurality of ceramic beads of a highly precise radius impregnated relatively uniformly within the adhesive itself, is applied to control the size of the adhesive spots between the first exit surface with the dichroic beam splitting layer of the first prism and the second entrance surface of the second prism. Preferably, one adhesive spot comprises at least three beads distributed over the spot area to provide a stable, reliable distance between the adjacent surfaces.

Overall, a high-performance dichroic beam splitting layer for reliable reflection of the first beams and/or the white light ray path is provided against a precisely defined air gap.

In another embodiment of the invention, the dichroic beam splitting layer is connected by means of an optical cement with the second entrance surface of the second prism.

In some embodiments, the properties of the dichroic beam splitting layer are specifically selected for their performance with respect to a given optical cement. The specifically selected dichroic beam splitting layer is directly in contact with the optical cement that connects the first exit surface of the first prism and the second entrance surface of the second prism. In this case, a dielectric coating, adhered to either the first exit surface of the first prism or the second entry surface of the second prism, directly contacting the optical cement acts as the dichroic beam splitting layer. Therewith, a highly reliable reflection of the first beams and/or white light is provided by the dichroic beam splitting layer with a direct connection of both prisms without an associated air gap therebetween.

In order to further increase the reflection of the entered, incoming beams at the first internal incident surface of the first prism, the first prism can comprise glass with a refractive index above 1.60, most preferably above 1.61, possibly above 1.70, optimizing, thereby, a total internal reflection of the beams of the first and second spectral regions at the first internal incident surface.

In general, the first internal incident surface is both transmissive and reflective depending on the angle of incidence of the rays. As a result of the desired total internal reflection, the incoming beams, arriving at the interface of the first internal incident surface of the first prism to the outside air, are not refracted into the air, but completely reflected back into the first prism. Hereby, the critical angle is the smallest angle of incidence that yields total reflection, wherein the critical angle is measured between the respective critical ray to the normal at the point of incidence at the first internal incident surface. Therefore, if the angle of incidence is close to the normal and below the critical angle, the first internal incident surface is transmissive. Conversely, when the angle of incidence is greater than the critical angle, total internal reflection occurs and the incoming beams, including both spectral regions, are reflected towards the first exit surface, and therewith towards the dichroic beam splitting layer. Thus, for example the incoming beams that are incident with an angle of incidence of approximately 45° on the first internal incident surface of the first prism to the normal and above a critical angle, are totally reflected with an angle of reflection of 45° from the normal, so that the incoming, reflected beams are redirected by an overall angle of 90°. Therewith, the first internal incident surface can be designed as being reliably, highly reflective for AOI rays >36° and highly transmissive for AOI rays <7°.

Therefore, the refractive index of the glass of the first prism is selected such that the incoming beams including both, the first and second spectral regions, are reflected reliably on the first internal incident surface by total internal reflection. Therefore, the glass of the first prism preferably has a respective higher refractive index compared to the opposite interface of the first internal incident surface, which is exposed to air. However, this is a compromise, as, with the higher refractive index of the glass of the first prism, the total internal reflection is optimized at the first internal incident surface, while, at the first exit surface of the first prism, the dichroic beam splitting layer is optimized when the first prism has a lower refractive index allowing also a more compact design of the beam splitting device. By selecting a specific refractive index of the glass, which is the same for both prisms, the required or preferred angles of both prisms may be correspondingly varied.

The "refractive index" of an optical medium is a dimensionless number that gives an indication of the light bending ability of the medium. The refractive index in particular determines how much the path of light is bent or refracted when entering the optical medium. For achieving a refractive index of above 1.61 is preferred.

In yet another embodiment, the first entrance surface and/or the first internal incident surface of the first prism comprises or comprise a wide band anti-reflection coating.

The wide band anti-reflection coating increases the transmission through the respective interface at the first entrance surface and/or the first internal incident surface. Furthermore, ghost images, which may result from, for example, water droplets or scratches present on the surface of the first internal incident surface of the prism, are inhibited by the wide band anti-reflection coating from being captured by the first image sensor. Further, in general, an anti-reflection coating may be applied to any surface, such as the first entrance surface of the first prism, to improve transmission of light therethrough.

An "anti-reflection coating" is in particular a type of optical coating applied to a surface of a beam splitting device, in particular to the first prism, to reduce reflection. In addition, the anti-reflection coating can also improve the contrast of the image by eliminating stray light and other sources of optical interference.

In order to optimize the capture of images corresponding to the first beams of the first spectral region by the first image sensor, the first prism is designed such that the first beams of the first spectral region, reflected by the dichroic beam splitting layer are incident on, and pass through, the first internal incident surface with an angle of incidence of approximately 90°.

In all cases, the reflected first beams are incident on the first internal incident surface with an angle of incidence less than the critical angle discussed above.

In yet another embodiment, a gap is arranged between an exit side of the first internal incident surface of the first prism and the first image sensor and/or between an exit side of the second exit surface of the second prism and the second image sensor.

Therewith, a gap, preferably an air gap, arranged between the exit side of the first internal incident surface of the first prism further enhances the total internal reflection at the first internal incident surface discussed above. Furthermore, an air gap arranged between the exit side of the respective surface of the first, and/or second prism and the respective image sensor, can be used to adjust the optical path lengths of the first beams and the second beams. In some instances, the optical path lengths may have the same value. However, in other instances, in order to correct for the focal lengths associated with each individual wavelength band, the optical path lengths for each beam may be different, such that an fluorescence image (consisting of wavelengths generally in the NIR region) is focused on its respective second image sensor, while white light, having a slightly different focal plane, will have a different associated path length, and its image sensor will be appropriately placed such that the white light image (generally consisting of light in the visible spectrum) is focused on its respective first image sensor. Hereby, either the dimension of the respective gap can be adjusted to achieve the required length of the respective optical path or the respective image sensor is locally shiftable by means of an actuator, for example a linear motor or a piezoactor. So, by adjusting the length of the respective air gap achieved by shifting the position of the respective image sensor, the focus can be optimized and both the white light and the fluorescence images can be collected in proper focus. Thus, the air gap can be used for the alignment of the focus and the position of the second image sensor in relation to the first image sensor.

In order to increase the contrast between both spectral regions, an optical filter coating is positioned on the exit side of the second exit surface, and/or between the exit side of the second exit surface and the second image sensor for increasing an optical density of the beams of the second spectral range.

The optional optical filter coating enables the ability for the optical density to be preferably increased to OD6 for radiation between 400 nm to 800 nm. This allows the further elimination of unwanted wavelengths outside of the second spectral region and/or the fluorescence spectrum. Consequently, because of this the optical filter coating, a high blocking for non-fluorescence radiation can be achieved. Depending on the quality of the dichroic beam splitting layer, a standard anti-reflection coating can alternatively be used as the optical filter coating.

In a further aspect of the invention, the problem is solved by an objective system for an endoscope, wherein the objective system is arrangeable in a distal end section of an elongate shaft of the endoscope, and at least a first image sensor for capturing images of a first spectral region and a second image sensor for capturing images of a second spectral region are arrangeable in the distal end section, wherein the objective system comprises an objective lens system with a first lens, a second lens and optional further lenses in order from an objective side to receive image light and to pass the image light towards the first image sensor and the second image sensor, wherein the objective system comprises a previously described beam splitting device, wherein the beam splitting device is arranged between a most proximal lens of the objective lens system and the first and second image sensor, and, optionally, a filter for blocking an excitation wavelength or for discriminating between the first and the second spectral regions.

Thus, an objective system for an endoscope is provided with only one optical path for two spectral regions, preferably for white light and fluorescence light imaging, wherein, after the lens system, the one optical path is split by the beam splitting device into a separate first optical path for the first beams within the first spectral region and a separate second optical path for the second beams within the second spectral region, allowing the simultaneous capture of images associated with each of the first and second spectral regions by separate dedicated image sensors. Therewith, an objective system with a dichroic beam splitting device is provided to be arranged in the distal end section of a narrow shaft of an endoscope.

An "objective system" is an optical system which includes an objective lens system to receive, pass forward and modify the image light from an object space, and at least two image sensors for capturing the image are assignable or are included.

An "objective lens system" comprises in particular, in an order from an object side, a cover glass and/or a first lens, a second lens, and optional further lenses, which are arranged along an optical axis of the lens system. Optionally, one or more optical filters can be located between any two lenses of the lens system.

A "lens" is, in particular, a transmissive optical body that focusses or disperses a light beam (light rays) by means of refraction. The first lens, the second lens and optional further lenses can be single lenses, which are separated by an air gap, or are in contact to adjacent lenses at most pointwise. Also, a lens can be a combined, compound, lens and/or a rod lens. Preferably, the lenses are made of glass and/or a crystalline material.

In a further aspect of the invention, the problem is solved by an endoscope, in particular a medical or industrial video endoscope with a handle, an elongate shaft, a light source, and objective system, and/or an image processing unit and/or a display system, wherein the endoscope comprises a previously described beam splitting device or the objective system is a previously described objective system, so that images of the first spectral region are captured by the first image sensor and images of the second spectral region are captured by the second image sensor separately in parallel and/or are displayable as overlaid images by the display system.

Figure 1:
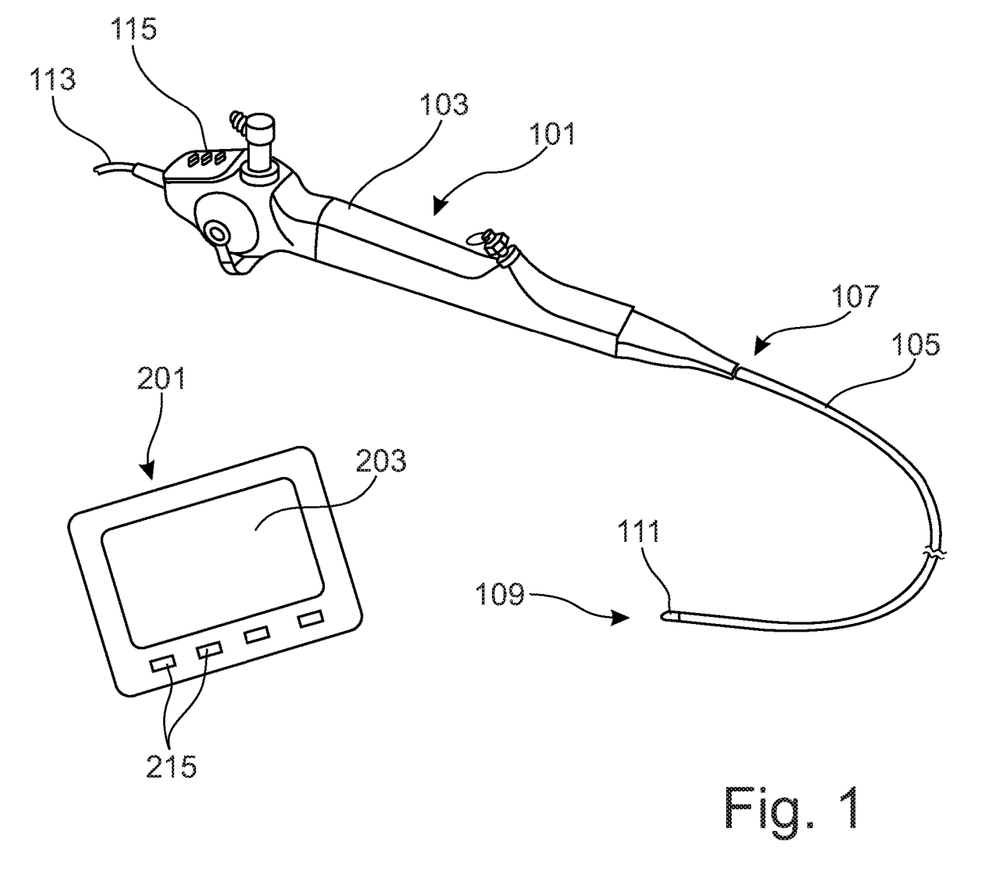
FIG. 1 is a schematic partially three-dimensional view of an endoscope and a display system.

The invention is further explained by the following exemplary descriptions of particular embodiments. The figures show:

A video endoscope 101 comprises a handle 103 and an elongate shaft 105 connectable to each other at a proximal end 107 of the shaft 105. The handle 103 comprises operator controls 115 and is connected via a cable 113 at its proximal end to an external, control and processing unit (not shown), often referred to as a camera control unit (CCU), and/or to a display system 201 shown in FIG. 1. The display system 201 includes a monitor 203 for displaying endoscopic images and operator controls 215.

The video endoscope 101 is designed to provide video and image data from an object space within a cavity of a body (not shown). For this, the elongate shaft 105 comprises at its distal end 109 a distal end section 111. The distal end section 111 of the elongate shaft 105 comprises an objective system 301 with an objective lens system 303 followed by a beam splitting device 401 on a proximal side 329 (see FIG. 2).

Figure 2:
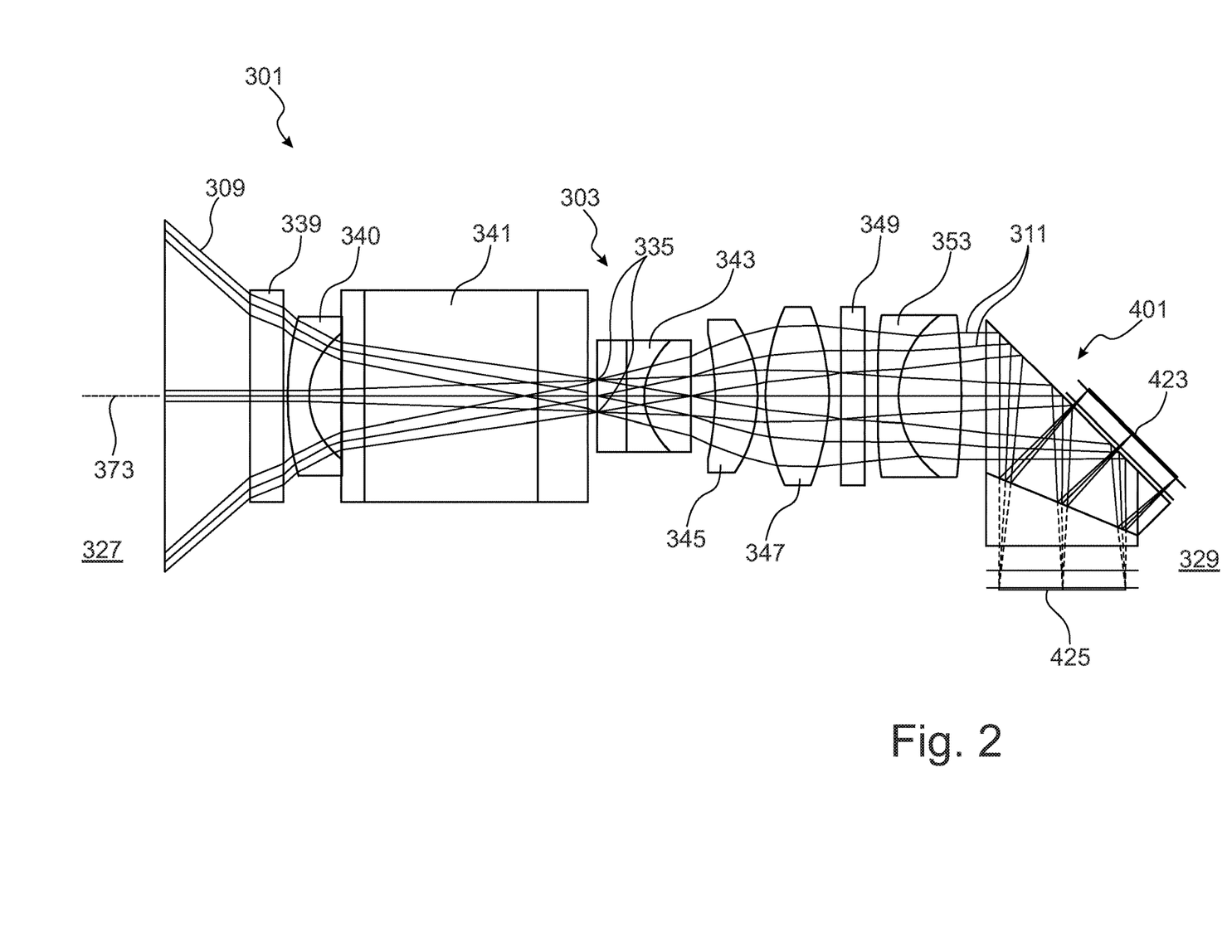
FIG. 2 is a schematic cross-sectional view of an objective system with a beam splitting device and two image sensors.

The lens system 303 comprises, along the optical axis 373 from the distal side 327 towards the proximal side 329, a cover glass 339, followed by a first, most distal, objective lens 340 followed by attenuating and/or relaying optical elements 341, a second lens 343 formed as a combined lens, a third lens 345, a fourth lens 347, and a conventional fluorescence filter 349 arranged between the fourth lens 347 and a following fifth lens 353 formed as a combined lens. Proximal to the fifth and last lens 353 of the lens system 303, the beam splitting device 401 is arranged including a first image sensor 423 for white light and a second image sensor 425 for fluorescence light. In the lens system 303, the fluorescence filter 349 serves to absorb the excitation wavelength of the fluorescence light and only passes the emission wavelength band of a fluorophore used in the object space.

Figure 3:
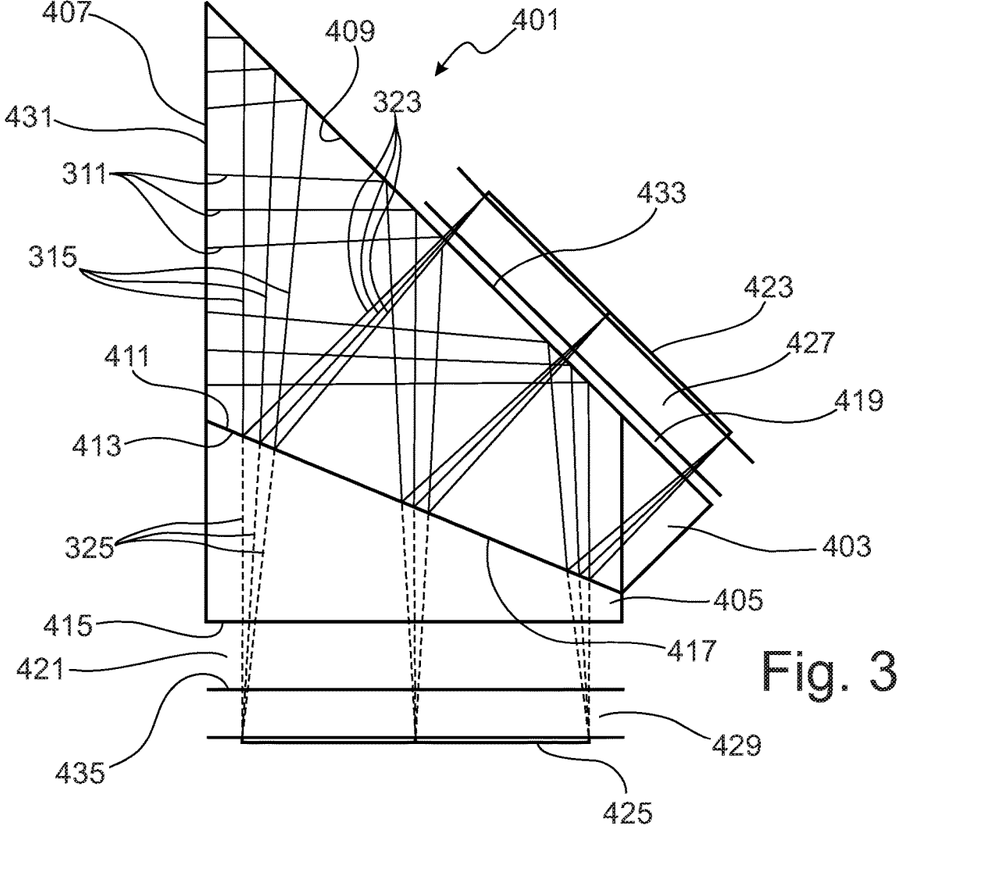
FIG. 3 is a schematic longitudinal cross-sectional view of the beam splitting device with two prisms and the two image sensors.

The beam splitting device 401 comprises the first prism 403 and the second prism 405, whereby the first prism 403 is arranged above the second prism 405, as shown in FIG. 3. The first prism 403 comprises a first entrance surface 407, that is oriented perpendicularly to the optical axis 373 of the objective system 301. A region of the first entrance surface 407 acts as an entrance aperture, and regions outside of an effective diameter of the incoming beam 311 are made opaque to incoming light. Therefore, areas of the first entrance surface 407 of the first prism 403, and the non-beam passing surfaces of the second prism 405 are coated with black paint as an opaque substance to avoid any stray or unwanted light from passing thereinto. The first entrance surface 407 comprises a wide band anti-reflection coating 431. Furthermore, the first prism comprises a first internal incident surface 409, which likewise comprises a wide band anti-reflection coating 433. On an exit side of the first internal incident surface 409, a first air gap 419 is located followed by a first sensor cover glass 427 and the first image sensor 423 for capturing white light. Furthermore, the first prism 403 comprises a first exit surface 411. The first exit surface 411 comprises a dichroic coating 417 that acts as a mirror for white light and as an anti-reflective coating for fluorescence emission light and is arranged adjacent to a second entrance surface 413 of the second prism 405. The second prism 405 comprises a second exit surface 415 which is arranged parallel to the optical axis 373 of the objective system 301. Between an exit side of the second exit surface 415, a second air gap 421 is arranged followed by the second sensor cover glass 429 and the second image sensor 425 for capturing fluorescence light (see FIG. 3).

Figure 4:
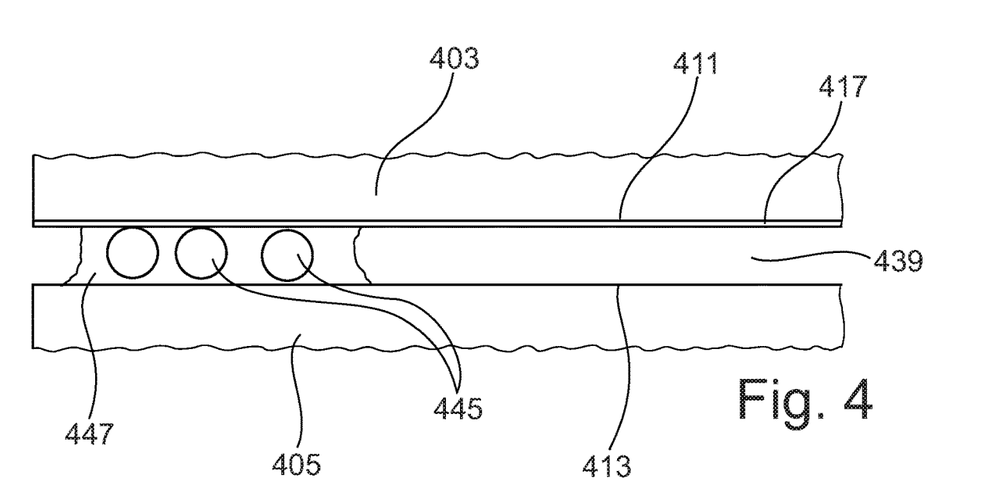
FIG. 4 is a schematic cross-sectional view on adjacent surfaces between a first prism and a second prism of the beam splitting device.

In between the first exit surface 411 with the dichroic coating 417 of the first prism 403 and the second entrance surface 413 of the second prism 405, an air gap 439 may be arranged (see FIG. 4). The air gap 439 has a thickness of 10 μm, which is assured by beads 445 with a respective diameter immobilized by an adhesive 447. The immobilized beads 445 contained within the corresponding adhesive 447 are arranged on outer edges between the first exit surface 411 with the dichroic coating 417 and the second entrance surface 413 (FIG. 4 only shows the spot on the left-hand side of the adjacent surfaces 411, 413).

In using the video endoscope 101, object beams 309 coming from the object space at the distal side 327 are collected by the objective system 301 and conditioned by the objective lens system 303 in a single optical path. After the last, fifth lens 353 of the lens system 303, incident beams 311 enter the beam splitting device 401 through the first entrance surface 407 of the first prism 403 and are incident on the first internal incident surface 409. As the first prism 403 comprises glass with a refractive index of 1.65 and, due to the arrangement of the air gap 419 at the exit side of the first internal incident surface 409, the incoming beams 311 comprising white light and fluorescence light are totally reflected on the first internal incident surface 409 and thereby are redirected 90° as first reflected incident beams 315. Consequently, the first reflected incident beams 315 are incident on the first exit surface 411 and the dichroic coating 417. The first reflected incident beams 315 are split by the dichroic coating 417 into white light beams 323 and fluorescence beams 325. The white light beams 323 are reflected by 45° back towards the first internal incident surface 409 and pass first internal incident surface 409 therethrough, and subsequently through the air gap 419 and the first sensor cover glass 427 to be captured by the first image sensor 423.

The fluorescence beams 325 are transmitted through the dichroic coating 417 and the air gap 439 in the region between the spots with the beads 445 immobilized in the adhesive 447. The fluorescence beams 325 traverse the second prism 405, leave it substantially perpendicular to the second exit surface 415, pass through the air gap 421 and the second sensor cover glass 429 to be captured by the second image sensor 425. Optionally, a coating may be added to the second exit surface 415 of the second prism 405 in order to increase transmission of the fluorescent beams (325) passing therethrough (such as an anti-reflection coating) or to further increase the contrast between the two spectral regions (such as a wavelength band-pass filter, which passes only expected emission radiation).

Therewith, a video endoscope 101 is provided with a compact objective system 301 and beam splitting device 401 arranged in its distal end section, which has a single optical path in the objective lens system 303 that is afterwards split by the beam splitting device 401 with the dichroic coating 417 into separate white light beams 323 and fluorescence beams 325 both being captured by separate first and second image sensors 423, 425 providing simultaneously high quality images.

REFERENCE NUMERALS 101 video endoscope
103 handle
105 elongate shaft
107 proximal end of shaft
109 distal end of shaft
111 distal end section
113 cable
115 operator controls
201 display system
203 monitor
215 operators controls
301 objective system
303 lens system
309 object beams
311 incident beams
315 first reflected incident beams
323 white light beams
325 fluorescent beams
327 distal side
329 proximal side
339 cover glass
340 first most distal objective lens
341 attenuating and/or relaying optical elements
343 second lens (combined)
345 third lens
347 fourth lens
349 fluorescence filter
353 fifth lens (combined)
373 optical axis
401 beam splitting device
403 first prism
405 second prism
407 first entrance surface
409 first internal incident surface
411 first exit surface
413 second entrance surface
415 second exit surface
417 dichroic coating
419 air gap
421 air gap
423 first image sensor (white light)

425 second image sensor (fluorescent light)
427 first sensor cover glass
429 second sensor cover glass
431 wide band anti-reflection coating
433 wide band anti-reflection coating
439 air gap
445 beads
447 adhesive

The invention claimed is:

1. A beam splitting and imaging device for a distal end section of an endoscope, the device comprising
a first prism with a first entrance surface, a first internal incident surface, and a first exit surface;
a second prism with a second entrance surface and a second exit surface;
a dichroic beam splitting layer; and
at least a first image sensor for capturing light of a first spectral region and a second image sensor for capturing light of a second spectral region,
wherein the first spectral region and the second spectral region differ at least partially in their spectral content from each other,
wherein an air gap is arranged between an exit side of the dichroic beam splitting layer and the second entrance surface of the second prism,
and wherein the first exit surface of the first prism and the second entrance surface of the second prism are adjacent, and the dichroic beam splitting layer is arranged between the adjacent surfaces such that incoming beams comprising the first and second spectral regions are reflected by the first internal incident surface of the first prism, subsequently incident on the first exit surface of the first prism, and are subsequently split by the dichroic beam splitting layer into first beams of the first spectral region and second beams of the second spectral region for capturing separate images of the first spectral region by the first image sensor and of the second spectral region by the second image sensor.

2. The device of claim 1, wherein the dichroic beam splitting layer is arranged on the first exit surface of the first prism or on the second entrance surface of the second prism.

3. The device of claim 1, further comprising a light source, wherein the light source comprises a first illumination spectral region comprising white light and a second excitation spectral region comprising excitation light, configured such that a fluorophore within an illuminated scene is caused to emit fluorescent light.

4. The device of claim 1, further comprising one or more distancing elements arranged in the air gap outside of a region of the adjacent surfaces through which the second beams of the second spectral region pass.

5. The device of claim 4, wherein the distancing element is, or the distancing elements are, immobilized by an adhesive in the air gap.

6. The device of claim 1, wherein the first prism comprises glass with a refractive index above 1.60, optimizing, thereby, a total internal reflection of the beams of the first and second spectral regions at the first internal incident surface.

7. The device of claim 1, wherein one or more of the first entrance surface and the first internal incident surface of the first prism comprises or comprise a wide band anti-reflection coating.

8. The device of claim 1, wherein a gap is arranged between an exit side of the first internal incident surface of the first prism and the first image sensor and/or between an exit side of the second exit surface of the second prism and the second image sensor.

9. The device of claim 1, wherein an optical filter coating is positioned on the exit side of the second exit surface, and/or between the exit side of the second exit surface and the second image sensor for increasing an optical density of the beams of the second spectral range.

10. An objective and image detecting system for an endoscope positioned in a distal end section of an elongate shaft of the endoscope, comprising:
a first image sensor for capturing images of a first spectral region,
a second image sensor for capturing images of a second spectral region,
an objective lens system comprising a first lens, a second lens, and optional further lenses, in order from an objective side to receive image light and to pass the image light towards the first image sensor and the second image sensor, and
wherein the objective system comprises:
a first prism with a first entrance surface, a first internal incident surface, and a first exit surface;
a second prism with a second entrance surface and a second exit surface;
a dichroic beam splitting layer; and
wherein an air gap is arranged between an exit side of the dichroic beam splitting layer and the second entrance surface of the second prism,
wherein the first spectral region and the second spectral region differ at least partially in their spectral content from each other,
and wherein the first exit surface of the first prism and the second entrance surface of the second prism are adjacent, and the dichroic beam splitting layer is arranged between the adjacent surfaces such that incoming beams comprising the first and second spectral regions are reflected by the first internal incident surface of the first prism, subsequently incident on the first exit surface of the first prism, and are subsequently split by the dichroic beam splitting layer into first beams of the first spectral region and second beams of the second spectral region for capturing separate images of the first spectral region by the first image sensor and of the second spectral region by the second image sensor.

11. The device of claim 10, wherein the beam splitting device is arranged between a most proximal lens of the objective lens system and the first and second image sensors.

12. The device of claim 10, further comprising an optical filter for blocking an excitation spectral region.

13. The device of claim 12, further comprising a light source, wherein the light source comprises a first illumination spectral region comprising white light and a second illumination spectral region comprising an excitation light with wavelengths in at least a portion of the excitation spectral region configured such that a fluorophore contained within an illuminated and exposed to the excitation light emit fluorescents light.

14. The device of claim 10, further comprising an optical filter for discriminating between the first and second spectral regions.

15. A beam splitting and imaging device for a distal end section of an endoscope, the device comprising
a first prism with a first entrance surface, a first internal incident surface, and a first exit surface;
a second prism with a second entrance surface and a second exit surface;

a dichroic beam splitting layer; and at least a first image sensor for capturing light of a first spectral region and a second image sensor for capturing light of a second spectral region, wherein the first spectral region and the second spectral region differ at least partially in their spectral content from each other, wherein the first exit surface of the first prism and the second entrance surface of the second prism are adjacent, and the dichroic beam splitting layer is arranged between the adjacent surfaces such that incoming beams comprising the first and second spectral regions are reflected by the first internal incident surface of the first prism, subsequently incident on the first exit surface of the first prism, and are subsequently split by the dichroic beam splitting layer into first beams of the first spectral region and second beams of the second spectral region for capturing separate images of the first spectral region by the first image sensor and of the second spectral region by the second image sensor, and wherein the first prism is configured such that the first beams of the first spectral region reflected by the dichroic beam splitting layer are incident on, and pass through, the first internal incident surface with an angle of incidence of approximately 90°.

* * * * *